United States Patent
Koenig et al.

(10) Patent No.: US 11,945,076 B2
(45) Date of Patent: Apr. 2, 2024

(54) ARTICLES INCLUDING POLYESTER BACKING AND PRIMER LAYER AND RELATED METHODS

(71) Applicant: 3M INNOVATIVE PROPERTIES COMPANY, St. Paul, MN (US)

(72) Inventors: Amelia W. Koenig, Minneapolis, MN (US); Liming Song, Woodbury, MN (US); Stephen M. Sanocki, Stillwater, MN (US); Yu Yang, Eden Prairie, MN (US); Yaohua Gao, Woodbury, MN (US); Aniruddha A. Upadhye, St. Paul, MN (US); Morgan A. Priolo, Woodbury, MN (US); Saurabh Batra, Minneapolis, MN (US); Angela S. McLean, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 438 days.

(21) Appl. No.: 17/261,709

(22) PCT Filed: Jul. 23, 2019

(86) PCT No.: PCT/IB2019/056300
§ 371 (c)(1),
(2) Date: Jan. 20, 2021

(87) PCT Pub. No.: WO2020/021457
PCT Pub. Date: Jan. 30, 2020

(65) Prior Publication Data
US 2021/0260724 A1 Aug. 26, 2021

Related U.S. Application Data

(60) Provisional application No. 62/702,029, filed on Jul. 23, 2018.

(51) Int. Cl.
*B24D 3/00* (2006.01)
*B24D 3/28* (2006.01)
(Continued)

(52) U.S. Cl.
CPC .............. *B24D 3/004* (2013.01); *B24D 3/007* (2013.01); *B24D 3/28* (2013.01); *C08J 7/042* (2013.01);
(Continued)

(58) Field of Classification Search
CPC . B24D 3/004; B24D 3/007; B24D 3/28; C08J 7/043; C08J 7/042; C08J 2367/02; C08J 2461/06
See application file for complete search history.

(56) References Cited

U.S. PATENT DOCUMENTS 2,958,593 A 11/1960 Hoover
3,225,013 A 12/1965 Fram
(Continued)

FOREIGN PATENT DOCUMENTS

EP 0776733 6/1997
WO WO 1993-012911 7/1993
(Continued)

OTHER PUBLICATIONS

International Search Report for PCT International Application No. PCT/IB2019/056300, dated Oct. 31, 2019, 6 pages.

*Primary Examiner* — Pegah Parvini
(74) *Attorney, Agent, or Firm* — Kathleen B. Gross

(57) ABSTRACT

An article (100) has a polyester film backing (110) and a primer layer (120) including a carboxylated styrene butadiene copolymer crosslinked with a polyfunctional aziridine disposed on a major surface of the polyester film backing (110). Another article includes a polyester backing (110), a primer layer (120) including a carboxylated styrene butadi-
(Continued)

ene copolymer crosslinked with a polyfunctional aziridine disposed on a major surface of the polyester backing (110), and a phenolic layer (140) disposed on the primer layer (120) on a surface opposite the polyester backing (110). The phenolic layer (120) can include abrasive particles (160). Processes for making the articles are also described, as well as methods for abrading a workpiece and improving adhesion between a polyester film backing (110) and a phenolic layer (120) on the polyester backing (110).

20 Claims, 2 Drawing Sheets

(51) Int. Cl.
  *C08J 7/04* (2020.01)
  *C08J 7/043* (2020.01)
(52) U.S. Cl.
  CPC .......... *C08J 7/043* (2020.01); *C08J 2367/02* (2013.01); *C08J 2453/02* (2013.01); *C08J 2461/06* (2013.01)

(56) References Cited

U.S. PATENT DOCUMENTS

| | | | |
|---|---|---|---|
| 4,437,865 A | 3/1984 | Parekh | |
| 4,749,617 A | 6/1988 | Canty | |
| 5,201,916 A | 4/1993 | Berg | |
| 5,304,224 A | 4/1994 | Harmon | |
| 5,344,688 A | 9/1994 | Peterson | |
| 5,355,636 A * | 10/1994 | Harmon | B24D 11/02 |
| | | | 51/297 |
| 5,486,219 A | 1/1996 | Ford | |
| 5,534,391 A | 7/1996 | Wang | |
| 5,565,011 A | 10/1996 | Follett | |
| 5,573,816 A | 11/1996 | Gaeta | |
| 5,591,239 A | 1/1997 | Larson | |
| RE35,570 E | 7/1997 | Rowenhorst | |
| 5,972,176 A | 10/1999 | Kirk | |
| 5,975,988 A | 11/1999 | Christianson | |
| 5,984,988 A | 11/1999 | Berg | |
| 6,017,831 A | 1/2000 | Beardsley | |
| 6,114,021 A * | 9/2000 | Pankratz | C08J 7/0423 |
| | | | 428/483 |
| 6,319,108 B1 | 11/2001 | Adefris | |
| 6,521,005 B1 | 2/2003 | Vincent | |
| 6,702,650 B2 | 3/2004 | Adefris | |
| 6,951,504 B2 | 10/2005 | Adefris | |
| 7,150,770 B2 | 12/2006 | Keipert | |
| 7,150,771 B2 | 12/2006 | Keipert | |
| 7,344,574 B2 | 3/2008 | Thurber | |
| 7,344,575 B2 | 3/2008 | Thurber | |
| 7,364,800 B2 | 4/2008 | Jesberger | |
| 7,393,901 B1 | 7/2008 | Filiatrault | |
| 8,034,137 B2 | 10/2011 | Erickson | |
| 8,123,828 B2 | 2/2012 | Culler | |
| 8,142,531 B2 | 3/2012 | Adefris | |
| 8,142,532 B2 | 3/2012 | Erickson | |
| 8,142,891 B2 | 3/2012 | Culler | |
| 8,764,865 B2 | 7/2014 | Boden | |
| 8,840,920 B2 | 9/2014 | Nugara | |
| 8,940,063 B2 | 1/2015 | Yang | |
| 9,085,838 B2 | 7/2015 | Maldonado Arellano | |
| 2006/0041065 A1 | 2/2006 | Barber, Jr. | |
| 2007/0287366 A1 | 12/2007 | Sanders | |
| 2010/0319269 A1 | 12/2010 | Erickson | |
| 2014/0080393 A1 | 3/2014 | Ludwig | |
| 2015/0052825 A1 | 2/2015 | Adefris | |

FOREIGN PATENT DOCUMENTS

| | | |
|---|---|---|
| WO | WO2001-062442 | 8/2001 |
| WO | WO 2006-127728 | 11/2006 |
| WO | WO 2015-088953 | 6/2015 |
| WO | WO 2018-005112 | 1/2018 |

* cited by examiner

ARTICLES INCLUDING POLYESTER BACKING AND PRIMER LAYER AND RELATED METHODS

CROSS-REFERENCE TO RELATED APPLICATION

This application is a national stage filing under 35 U.S.C. 371 of PCT/IB2019/056300, filed Jul. 23, 2019, which claims priority to U.S. Provisional Application No. 62/702,029, filed Jul. 23, 2018, the disclosure of which is incorporated by reference in its entirety herein.

BACKGROUND

In general, coated abrasive articles have abrasive particles secured to a backing. Coated abrasive articles can include a backing having two major opposed surfaces and an abrasive layer secured to one of the major surfaces. The abrasive layer typically includes abrasive particles and a binder for securing the abrasive particles to the backing.

One type of coated abrasive article has an abrasive layer that includes a make layer, a size layer, and abrasive particles. In making such a coated abrasive article, a make layer including a first binder precursor can be applied to a major surface of the backing. Abrasive particles are then at least partially embedded into the make layer (for example, by electrostatic coating), and the first binder precursor is cured (that is, crosslinked) to secure the particles to the make layer. A size layer including a second binder precursor can be applied over the make layer and abrasive particles, followed by curing of the second binder precursor and possibly further curing of the first binder precursor.

Another type of coated abrasive article includes an abrasive layer secured to a major surface of a backing, wherein the abrasive layer is provided by applying a slurry comprised of binder precursor and abrasive particles onto a major surface of a backing, and then curing the binder precursor.

Supersize layers can be useful in some cases for covering the abrasive layer. The supersize layer typically includes grinding aids and/or anti-loading materials.

Optionally, backings used in coated abrasive articles may be treated with one or more applied coatings. Examples of typical backing treatments are a backsize layer (that is, a coating on the major surface of the backing opposite the abrasive layer), a presize layer or a tie layer (that is, a coating on the backing disposed between the abrasive layer and the backing), and/or a saturant that saturates the backing. A subsize is similar to a saturant, except that it is applied to a previously treated backing.

Depending on the choice of abrasive layer and backing (treated or untreated), the abrasive layer may partially separate from the backing during abrading, resulting in the release of abrasive particles. This phenomenon is known in the abrasive art as "shelling". In most cases, shelling is undesirable because it results in a loss of performance. A tie layer is sometimes disposed between the backing and the abrasive layer. See, for example, U.S. Pat. No. 5,304,224 (Harmon) and U.S. Pat. No. 5,355,636 (Harmon). A tie layer has been used to address the problem of shelling in some coated abrasive articles, for example, U.S. Pat. No. 7,150,770 (Keipert et al.)

In unrelated technologies, it has been reported that polyethylene terephthalate does not adhere well to applied coatings such as metal coatings and inks. Certain primers are proposed to solve this problem in U.S. Pat. No. 6,114,021 (Pankratz et al.).

SUMMARY

We have found that plain, untreated polyester film does not bond with phenolic resins. Phenolic resin and polyethylene terephthalate (PET) film are two common materials useful for making abrasive products. However, we have found that phenolic resins do not bond well to plain PET film. The present disclosure provides articles that include a primer on a polyester backing, which are useful, for example, for improving the adhesion to a make resin layer, for example, a phenolic resin layer, in an abrasive article.

In one aspect, the present disclosure provides an article that includes a polyester film backing and a primer layer including a carboxylated styrene butadiene copolymer crosslinked with a polyfunctional aziridine disposed on a major surface of the polyester film backing.

In some embodiments, the article further includes a layer of phenolic disposed on the primer layer on a surface opposite the polyester film backing. In some of these embodiments, the layer of phenolic further comprises abrasive particles embedded therein, and the article can be considered an abrasive article.

In another aspect, the present disclosure provides a process for making the aforementioned article. The process includes coating a composition comprising the carboxylated styrene butadiene copolymer and the polyfunctional aziridine onto the major surface of the polyester film backing and crosslinking the carboxylated styrene butadiene copolymer with the polyfunctional aziridine.

In some embodiments, the process further includes coating a phenolic resin on the primer layer on a surface opposite the polyester film backing and curing the phenolic resin. In some of these embodiments, the process further includes disposing abrasive particles on the phenolic resin before curing the phenolic resin.

In another aspect, the present disclosure provides a method of improving adhesion between a polyester film backing and a phenolic layer on the polyester film backing. The method includes coating a composition including a carboxylated styrene butadiene copolymer and a polyfunctional aziridine onto a major surface of the polyester film backing, crosslinking the carboxylated styrene butadiene copolymer with the polyfunctional aziridine to form a primer layer, coating a phenolic resin on the primer layer on a surface opposite the polyester film backing, and curing the phenolic resin.

In another aspect, the present disclosure provides an abrasive article that includes a polyester backing, a primer layer disposed on a major surface of the polyester backing; and a phenolic layer disposed on the primer layer on a surface opposite the polyester film backing. The phenolic layer has abrasive particles embedded therein. The primer layer includes a carboxylated styrene butadiene copolymer crosslinked with a polyfunctional aziridine.

In another aspect, the present disclosure provides a method of abrading a workpiece. The method includes providing an abrasive article described above in any of its aspects, frictionally contacting at least a portion of the abrasive particles with at least a portion of a surface of the workpiece, and moving the workpiece and the abrasive article relative to each other to abrade at least a portion of the surface.

In this application, terms such as "a", "an" and "the" are not intended to refer to only a singular entity but include the general class of which a specific example may be used for illustration. The terms "a", "an", and "the" are used interchangeably with the term "at least one". The phrases "at least one of and" comprises at least one of followed by a list refers to any one of the items in the list and any combination of two or more items in the list. All numerical ranges are inclusive of their endpoints and integral and non-integral values between the endpoints unless otherwise stated (e.g. 1 to 5 includes 1, 1.5, 2, 2.75, 3, 3.80, 4, and 5).

The term "latex" refers to a polymer dispersion in water, wherein the polymer can be in a liquid state, a solid state, or any combination thereof, wherein the dispersion can be an emulsion or a solution of the polymer in the water.

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility but may be swellable in the presence of an appropriate solvent.

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

Figure 1:
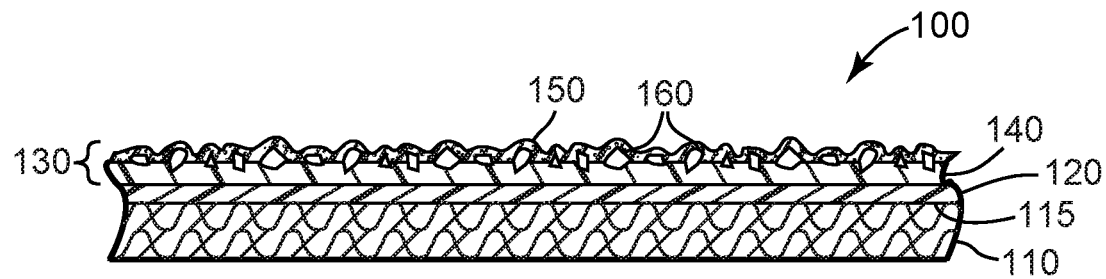
FIG. 1 is a cross-sectional view of an embodiment of an abrasive article of the present disclosure.

While the above-identified drawings and figures set forth embodiments of this disclosure, other embodiments are also contemplated, as noted in the Detailed Description. In all cases, this disclosure presents the invention by way of representation and not limitation. It should be understood that numerous other modifications and embodiments can be devised by those skilled in the art, which fall within the scope of this disclosure. The figures may not be drawn to scale.

DETAILED DESCRIPTION

In some aspects, articles, processes, and methods of the present disclosure include a polyester film backing. Useful polyester films may be manufactured from various types of thermoplastic polyester resins, including polyethylene terephthalate, polytetramethylene terephthalate, polyethylene-2,6-naphthalate, and poly-1,4-cyclohexylene dimethyl terephthalate. Polyester copolymers (e.g., polyethylene terephthalate/isophthalate, polyethylene terephthalate/adipate, polyethylene terephthalate/sebacate, polyethylene terephthalate/sulfoisophthalate, and polyethylene terephthalate/azelate) may also be useful. In some embodiments of the articles, processes, and methods of the present disclosure, the polyester film backing comprises polyethylene terephthalate (PET). In some embodiments, the polyester film backing has a uniform composition throughout its thickness. In other embodiments, PET or any of the polyesters described above may be included in a layer of a multilayer film backing. In these cases, the polyester layer would be in contact with the primer layer.

In polyester film backings useful for practicing some aspects the present disclosure, the film backing would be considered monolithic (that is, having a generally uniform film composition) and is not fibrous. Particularly, the film backing is not a nonwoven material. The polyester film backing can be described as a dense film and not an open, lofty, fibrous web.

In general, polyester film backings useful for practicing some aspects of the present disclosure have a Gurley porosity of more than 50 seconds when measured according to FTMS No. 191, Method 5452 (Dec. 31, 1968) (as referred to in the Wellington Sears Handbook of Industrial Textiles by E. R. Kaswell, 1963 ed., p 575) using a Gurley Permeometer (available from Teledyne Gurley, Inc., Troy, N.Y.). The Gurley Permeometer measures the amount of time, in seconds, required for 100 cubic centimeters of air to pass through the backing material.

Polyester film backings useful for practicing some aspects of the present disclosure can have a variety of thicknesses. In some embodiments, the thickness of the polyester film backing is in a range from 1 micrometer to 500 micrometers, 10 micrometers to 350 micrometers, 25 micrometers to 250 micrometers, or 35 micrometers to 200 micrometers.

In some embodiments, the polyester film backing is surface-treated before the primer layer is applied. Useful surface treatments include electrical discharge in the presence of a suitable reactive or non-reactive atmosphere (e.g., plasma, glow discharge, corona discharge, dielectric barrier discharge or atmospheric pressure discharge); ultraviolet light exposure, electron beam exposure, flame discharge, and scuffing. The surface treatment can be applied as the polyester film backing is being made or in a separate process. In some embodiments, the polyester film backing is surface-treated using corona discharge. An example of a useful corona discharge process is described in U.S. Pat. No. 5,972,176 (Kirk et al.).

The polyester film backing useful for practicing the present disclosure may be oriented, either uniaxially or biaxially. Orientation of a film at a temperature above its glass transition temperature can be useful for enhancing at least one of the stiffness, modulus, or creep resistance of the film. Orientation can conveniently be carried out by conventional methods such as mechanical stretching (drawing) or tubular expansion with heated air or gas. Examples of useful draw ratios are in the range of 2.5 to 6 times in the machine, cross-machine direction, or both the machine and cross-machine directions. Larger draw ratios (for example, up to about 8 times) may also be useful if the film is oriented in only one direction. For biaxially oriented film backings, the film may be stretched equally in the machine and cross-machine directions or unequally in the machine and cross-machine directions.

Articles, processes, and methods of the present disclosure include a primer layer comprising a carboxylated styrene butadiene copolymer crosslinked with a polyfunctional aziridine disposed on a major surface of the polyester backing, in some aspects, the polyester film backing.

Styrene butadiene copolymers are prepared by copolymerizing styrene and butadiene, typically using emulsion polymerization. Styrene butadiene copolymers can be carboxylated by including acidic monomers in the polymerization reaction. Examples of useful acidic monomers include acrylic acid, maleic acid, methacrylic acid, monoalkyl esters of maleic acid, fumaric acid, monoalkyl esters of fumaric acid, itaconic acid, isocrotonic acid, crotonic acid, citraconic acid, and beta-carboxyethyl acrylate. Typically, the styrene butadiene copolymer is carboxylated by including acrylic acid or methacrylic acid in the polymerization. Other monomers may be incorporated into the carboxylated styrene butadiene copolymer. Examples of other suitable monomers include acrylonitrile, hydroxymethylacrylamide, and hydroxyethyl acrylate.

The carboxylated styrene butadiene copolymer can be prepared using conventional techniques for emulsion polymerization and can be used as a latex. Any suitable portion of the latex can be water (e.g., with the remainder being the carboxylated styrene butadiene copolymer, optionally including additives). For example, the latex can include about 10 weight percent (wt. %) to about 90 wt. %, or about 30 wt. % to about 80 wt. %, or about 10 wt. % or less water. The latex can also include less than, equal to, or greater than about 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. %, or about 90 wt % or more water. Some carboxylated styrene butadiene latexes are commercially available, for example, from Mallard Creek Polymers, Charlotte, N.C., under the trade designation "ROVENE 5900", from Dow Chemical Company, Midland, Mich., under the trade designation "LXZ", and from Trinseo LLC, Berwyn, Pa.

The amount of carboxylated styrene butadiene copolymer in the primer layer precursor (that is, before crosslinking) is generally in a range of from at least 90, 91, or 92 percent by weight up to 94, 96, 98, or 99.5 percent by weight, based on the total weight of polyfunctional aziridine, carboxylated styrene butadiene copolymer, and other components in the primer layer precursor.

The primer layer useful for practicing the various aspects of the present disclosure includes a polyfunctional aziridine. The polyfunctional aziridine can have a variety of structures and includes a plurality of aziridinyl groups. Examples of suitable polyfunctional aziridines include those disclosed in U.S. Pat. No. 3,225,013 (Fram); U.S. Pat. No. 4,769,617 (Canty); and U.S. Pat. No. 5,534,391 (Wang). Specific examples include trimethylolpropane tris[3-aziridinyl propionate]; trimethylolpropane tris[3-(2-methylaziridinyl)propionate]; trimethylolpropane tris[2-aziridinylbutyrate]; tris (1-aziridinyl)phosphine oxide; tris(2-methyl-1-aziridinyl) phosphine oxide; pentaerythritol tris[3-(1-aziridinyl) propionate]; and pentaerythritol tetrakis[3-(1-aziridinyl) propionate]. Combinations of more than one polyfunctional aziridine may also be useful.

Commercially available polyfunctional aziridines include those available under the trade designations "XAMA-2" (believed to be trimethylolpropane tris[3-(2-methylaziridinyl)propanoate]) and "XAMA-7" (believed to be pentaerythritol tris(beta-(N-aziridinyl)propionate)) from EIT, Inc. Corporation, Lake Wylie, South Carolina; "HYDROFLEX XR2990" (believed to be trimethylolpropane tris[3-(2-methylaziridinyl)propanoate]) from H.B. Fuller Co., Vadnais Heights, Minnesota; "PZ-28" (believed to be trimethylolpropane tris[3-(2-methylaziridinyl)-propionate]) from PolyAziridine LLC, Morgantown, New Jersey and "NEOCRYL CX-100" (believed to be trimethylolpropane tris[3-(2-methylaziridinyl)-propanoate]) from Zeneca Resins, Wilmington, Massachusetts.

The amount of polyfunctional aziridine in the primer layer precursor is generally in a range of from at least 0.1, 0.25, 0.5, 1, or 2 percent by weight up to 4, 6, 8, or 10 percent by weight, or more, based on the total weight of polyfunctional aziridine, carboxylated styrene butadiene copolymer, and other components in the primer layer.

The primer layer can include one or more additives, if desired. In some embodiments, the primer layer useful for practicing the present disclosure, includes at least one of an organic solvent, a surfactant, an emulsifier, a dispersant, a catalyst, a rheology modifier, a density modifier, a cure modifier, a diluent, an antioxidant, a heat stabilizer, a flame retardant, a plasticizer, filler, a polishing aid, a pigment, a dye, an adhesion promoter, antistatic additives. In various embodiments, the presence or lack of certain of these additives can reduce cost, control viscosity, or improve physical properties. In some embodiments, the primer layer comprises a surfactant.

The process for making the article according to the present disclosure includes coating a composition including the carboxylated styrene butadiene copolymer and the polyfunctional aziridine described above in any of their embodiments onto the polyester film backing. Coating the composition onto the polyester film backing can be performed in a variety of ways including brushing, spraying, roll coating, curtain coating, gravure coating, and knife coating. The coated backing may then be processed for a time at a temperature sufficient to dry and at least partially crosslink the coating to form the primer layer on the backing. Without wanting to be bound by theory, we believe aziridine groups in the polyfunctional aziridine react with the carboxylic acid groups in the carboxylated styrene butadiene copolymer to form crosslinks. The reaction may be carried out in air or in an inert atmosphere (e.g., nitrogen or argon). Elevated temperatures can be useful for drying the coating composition (e.g., removing the water present in the latex) and accelerating the crosslinking reaction. The coating composition on the polyester film backing can be heated, in some embodiments, for at least 1, 2, 5, or 10 minutes and up to 1 or 2 hours at a temperature of at least 100° C., 110° C., or 120° C. and up to 200° C., 190° C., or 180° C.

We have found that when a polyfunctional aziridine is used as a crosslinker, the resulting primer layer has better adhesion to the polyester film backing than when other common crosslinkers are used to make a primer layer. Illustrative Examples 21 to 24, below, illustrate that a melamine crosslinker was only effective when added at 30% by weight relative to the weight of the carboxylated styrene butadiene copolymer to provide any increase in adhesion to a polyester film backing relative to a coating composition including no crosslinker as measured by the Cross-cut Test described in the Examples, below. In contrast, only 1% by weight of the polyfunctional aziridine was required to achieve the same improvement in adhesion as evidenced by the Cross-Cut test. Even better adhesion was measured using the Cross-Cut Test when the level of the polyfunctional aziridine was increased to 2.5% by weight and 5% by weights, levels at which the melamine crosslinker was ineffective.

We have also found that the primer on the polyester film backing improves adhesion, for example, to a phenolic layer in an abrasive article as measured by the Abrasive Article Hand Shelling Test described in the Examples, below. When no primer layer was used, heavy shelling was observed. It is also shown in the Examples, below, that in some cases, the thickness of the primer layer influences the adhesion between the polyester film backing and the phenolic resin as measured by the Abrasive Article Hand Shelling Test. In some cases, better adhesion performance was observed when the thickness of the primer layer greater than ten micrometers. Accordingly, it some embodiments, the primer layer has a thickness of at least ten (in some embodiments, greater than 10 or at least 15, 20, or 25) micrometers. In some embodiments, the primer layer has a thickness of up to 50 micrometers, 75 micrometers, 100 micrometers, or higher.

Due to the improvement in adhesion, for example, to a phenolic layer, in some embodiments of the article, process, and method of the present disclosure, the article further includes a layer of phenolic disposed on the primer layer on a surface opposite the polyester film backing. The phenolic can be a resole or novolac. Resole phenolic resins are catalyzed by alkaline catalysts, and the ratio of formaldehyde to phenol is greater than or equal to one, typically between 1.5:1 to 3.0:1. Examples of alkaline catalysts are sodium hydroxide, barium hydroxide, potassium hydroxide, calcium hydroxide, organic amines, and sodium carbonate. Novolac phenolic resins are typically catalyzed by acid catalysts, and the ratio of formaldehyde to phenol is less than one, typically between 0.75:1 to 0.85:1 or lower. Phenolic resins are thermosetting resins and, when cured, exhibit excellent toughness, dimensional stability, strength, hardness, and heat resistance.

Both the resole and novolac phenolic resins, with the addition of the appropriate curing agent or initiator, are cured by thermal energy. Phenolic resins are commercially available, for example, from Georgia Pacific, and under the following trade designations: "RESIN-FLAKE", "GP", and "AEROFENE" from Ashland Chemical Co., and "BAKE-LITE" and "DURITE" from Hexion, Inc.

In some embodiments, the phenolic layer can be rubber modified. Various latex resins can be combined with phenolic resins, including any of those described above in any of their embodiments, to improve the toughness of the phenolic, for example, and/or to improve the adhesion of the phenolic layer to the primer layer on the polyester film backing. For example, the latex can be a polyacrylate latex, an ethylene-acrylate latex, a polyester urethane latex, a bromo isobutylene isoprene latex, a polybutadiene latex, a chloro isobutylene isoprene latex, a polychloroprene latex, a chlorosulphonated polyethylene latex, an epichlorohydrin latex, an ethylene propylene latex, an ethylene propylene diene monomer latex, a polyether urethane latex, a perfluorocarbon latex, a fluoronated hydrocarbon latex, a fluoro silicone latex, a fluorocarbon rubber latex, a hydrogenated nitrile butadiene latex, a polyisoprene latex, an isobutylene isoprene butyl latex, an acrylonitrile butadiene latex, a polyurethane latex, a styrene butadiene latex, a styrene ethylene butylene latex, a polysiloxane latex, a vinyl methyl silicone latex, or a combination thereof. The latex can be a styrene butadiene latex, an acrylic latex, an acrylonitrile butadiene latex, a polyurethane latex, or a combination thereof. The latex can be a styrene butadiene latex. The latex can be a carboxylated latex (e.g., carboxylated using any of the methods described above). The latex can be a carboxylated styrene butadiene latex.

Any suitable portion of the latex can be water (e.g., with the remainder being any of the polymers described above, optionally including additives). For example, the latex can include about 10 wt. % to about 90 wt. %, or about 30 wt. % to about 80 wt. %, or about 10 wt. % or less water. The latex can also include less than, equal to, or greater than about 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt %, or about 90 wt % or more water.

Latexes are commercially available from a variety of different sources including: "RHOPLEX", commercially available from Dow Chemical Company, "FLEXCRYL", commercially available from Ashland Inc., "SYN-THEMUL", commercially available from Reichold Chemical Co., "HYCAR", commercially available from Lubrizol, "CHEMIGUM", commercially available from OMNOVA Solutions Inc., "NEOCRYL", commercially available from DSM Coating Resins, "BUTAFON", commercially available from BASF, and "ROVENE 5900" and "TYLAC", commercially available from from Mallard Creek Polymers.

For a rubber-modified phenolic, a variety of weight ratios of the phenolic resin to the latex (e.g., including any of those described above) may be useful. In some embodiments, a weight ratio of dry materials of the phenolic resin to the latex is in a range from 99:1 to 50:50, from 95:5 to 55:45, or from 90:10 to 60:40.

In some embodiments, the process of any one of the present disclosure further includes coating a phenolic resin on the primer layer on a surface opposite the polyester film backing and curing the phenolic resin. In some embodiments, the process further includes combining the phenolic resin with a latex including any of the latexes described above and in any of the ratios described above.

Curing the phenolic resin, optionally in the presence of the latex, can be carried out by heating at an elevated temperature. The conditions selected for heating the phenolic resin can be any time and temperature sufficient for drying the coating composition (e.g., removing the water present in the latex) and accelerating the polymerization and crosslinking reactions in the phenolic resin. The phenolic resin, optionally in the presence of latex, can be heated, in some embodiments, for at least 1, 2, 5, or 10 minutes and up to 1 or 2 hours at a temperature of at least 100° C., 110° C., or 120° C. and up to 200° C., 190° C., or 180° C. For example, the construction can be exposed to heat at a temperature between 50 to 130° C., in some embodiments 80 to 110° C., for a time ranging from 30 minutes to 3 hours. Heating can be carried out in stages, for example, at one temperature for a certain time and then a higher temperature for a certain time. After heating, the phenolic resin is polymerized or cured and is converted into a solidified phenolic layer.

In some embodiments, the article of the present disclosure and/or made by the process or method of the present disclosure is an abrasive article. In some embodiments of the article of the present disclosure, the layer of phenolic further comprises abrasive particles embedded therein. In some embodiments of the process of the present disclosure, the process includes disposing abrasive particles on the phenolic resin before curing the phenolic resin.

A variety of abrasive particles are useful in the articles, processes, and methods disclosed herein. Examples of useful abrasive particles include fused aluminum oxide, heat treated aluminum oxide, white fused aluminum oxide, black silicon carbide, green silicon carbide, titanium diboride, boron carbide, tungsten carbide, titanium carbide, diamond, cubic boron nitride, garnet, fused alumina zirconia, sol gel abrasive particles, silica, iron oxide, chromia, ceria, zirconia, titania, silicates, metal carbonates (such as calcium carbonate (for example, chalk, calcite, marl, travertine, marble and limestone), calcium magnesium carbonate, sodium carbonate, magnesium carbonate), silica (for example, quartz, glass beads, glass bubbles and glass fibers) silicates (for example, talc, clays, (montmorillonite) feldspar, mica, calcium silicate, calcium metasilicate, sodium aluminosilicate, sodium silicate) metal sulfates (for example, calcium sulfate, barium sulfate, sodium sulfate, aluminum sodium sulfate, aluminum sulfate), gypsum, aluminum trihydrate, graphite, metal oxides (for example, tin oxide, calcium oxide), aluminum oxide, titanium dioxide) and metal sulfites (for example, calcium sulfite), metal particles (for example, tin, lead, copper), plastic abrasive particles formed from a thermoplastic material (for example, polycarbonate, polyetherimide, polyester, polyethylene, polysulfone, polystyrene, acrylonitrile-butadiene-styrene block copolymer, polypropylene, acetal polymers, polyvinyl chloride, polyurethanes, nylon), plastic abrasive particles formed from crosslinked polymers (for example, phenolic resins, aminoplast resins, urethane resins, epoxy resins, melamine-formaldehyde, acrylate resins, acrylated isocyanurate resins, urea-formaldehyde resins, isocyanurate resins, acrylated urethane resins, acrylated epoxy resins), and combinations thereof.

Abrasive particles useful for practicing the present disclosure may be crushed or may have regular or irregular shapes. Examples of suitable shaped abrasive particles include those produced by molding a sol-gel, drying, and sintering the dried sol-gel to obtain shaped ceramic abrasive particles as described in U.S. Pat. No. 5,201,916 (Berg), U.S. Pat. No. 5,984,988 (Berg), Re. 35,570 (Rowenhorst), U.S. Pat. No. 8,034,137 (Erickson), U.S. Pat. No. 8,123,828 (Culler), U.S. Pat. No. 8,142,531 (Adefris), U.S. Pat. No. 8,142,891 (Culler), U.S. Pat. No. 8,142,532 (Erickson), and U.S. Pat. No. 8,764,865 (Boden), and in U.S. Pat. Appl. Pub. Nos. 2010/0319269 (Erickson) and 2015/0052825 (Adefris). Shaped abrasive agglomerate particles may also be useful for practicing the present disclosure, for example, agglomerates including various abrasive particles in a ceramic matrix such as those disclosed in U.S. Pat. No. 5,975,988 (Christianson), U.S. Pat. Nos. 6,319,108, 6,702,650, and 6,951,504 (each to Adefris) and in Int. Pat. Appl. Pub. No. WO2015/088953 (Kasai) and agglomerates including shaped abrasive particles in an organic resin matrix such as those disclosed in U.S. Pat. Appl. Pub. No. 2014/0080393 (Ludwig).

Referring to FIG. 1, an embodiment of an abrasive article 100 according to the present disclosure has backing 110, a primer layer 120 secured to major surface 115 of backing 110 and abrasive layer 130 secured to primer layer 120. Abrasive layer 130 includes abrasive particles 160 secured to the article 100 by make layer 140 and size layer 150.

Abrasive particles are at least partially embedded (for example, by electrostatic coating) in the make layer precursor, in some embodiments, comprising the phenolic resin, and the make layer precursor is at least partially polymerized. Next, the size layer is prepared by coating at least a portion of the make layer and abrasive particles with a size layer precursor comprising a second resin (which may be the same as, or different from, the make layer precursor), and at least partially curing the size layer precursor. The make and size layers may comprise any binder resin that is suitable for use in abrading applications. In some embodiments, the make layer precursor may be partially polymerized prior to coating with abrasive particles and further polymerized at a later point in the manufacturing process. In some embodiments, a supersize layer may be applied to at least a portion of the size layer.

Figure 2:
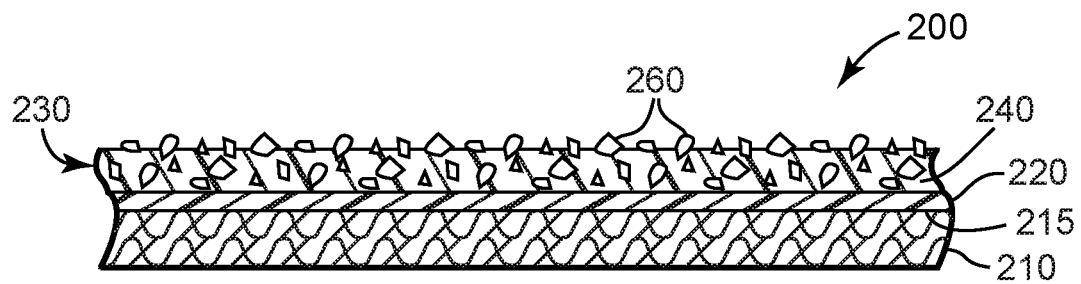
FIG. 2 is a cross-sectional view of another embodiment of an abrasive article of the present disclosure.

In another embodiment of an abrasive article according to the present disclosure, the abrasive layer may comprise abrasive particles dispersed in a binder, in some embodiments, a phenolic layer. Referring now to FIG. 2, abrasive article 200 has backing 210, primer layer 220 secured to major surface 215 of backing 210, and abrasive layer 230 secured to primer layer 220. Abrasive layer 230 includes abrasive particles 260 dispersed in binder 240, in some embodiments, a phenolic layer. In making such a coated abrasive article, a slurry comprising a binder precursor (in some embodiments, phenolic resin) and abrasive particles is typically applied to a major surface of the backing, and the binder precursor is then at least partially cured.

Figure 3:
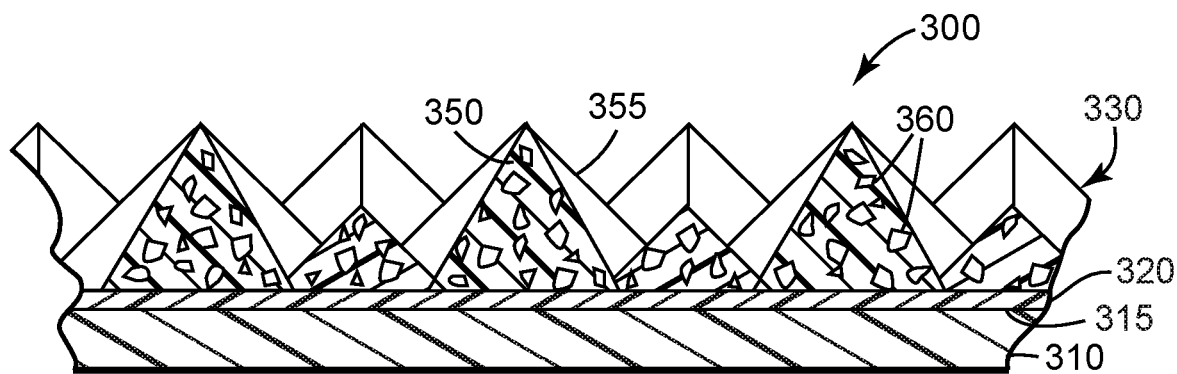
FIG. 3 is a cross-sectional view of yet another embodiment of an abrasive article of the present disclosure.

In another embodiment, an abrasive article according to the present disclosure may comprise a structured abrasive article. Referring now to FIG. 3, structured abrasive article 300 has backing 310, primer layer 320 secured to major surface 315 of backing 310, and abrasive layer 330 secured to primer layer 320. Abrasive layer 330 includes a plurality of precisely-shaped abrasive composites 355. The abrasive composites comprise abrasive particles 360 dispersed in binder 350.

In making such an abrasive article, a slurry comprising a binder precursor (in some embodiments, phenolic resin) and abrasive particles may be applied to a tool having a plurality of precisely-shaped cavities therein. The slurry is then at least partially polymerized and adhered to the primer layer, for example, by adhesive or polymerization of the slurry. The abrasive composites may have a variety of shapes including, for example, those shapes selected from the group consisting of cubic, block-like, cylindrical, prismatic, pyramidal, truncated pyramidal, conical, truncated conical, cross-shaped, and hemispherical.

Optionally, abrasive articles according to the present disclosure may further comprise, for example, a backsize, a presize and/or subsize (that is, a coating between the primer layer and the major surface to which the primer layer is secured), and/or a saturant which coats both major surfaces of the backing. Abrasive articles may further comprise a supersize covering at least a portion of the abrasive coat. If present, the supersize typically includes grinding aids and/or anti-loading materials.

In some embodiments, the abrasive layer of the present disclosure comprises a make layer, abrasive particles embedded in the make layer, and a size layer secured to the make layer and abrasive particles. As described above, the make layer and size layer in the abrasive articles of the present disclosure in any of their embodiments may be made from the same or different materials. Examples of these materials include amino resins, alkylated urea-formaldehyde resins, melamine-formaldehyde resins, and alkylated benzoguanamine-formaldehyde resin, acrylate resins (including acrylates and methacrylates) such as vinyl acrylates, acrylated epoxies, acrylated urethanes, acrylated polyesters, acrylated acrylics, acrylated polyethers, vinyl ethers, acrylated oils, and acrylated silicones, alkyd resins such as urethane alkyd resins, polyester resins, reactive urethane resins, epoxy resins such as bisphenol epoxy resins, isocyanates, isocyanurates, polysiloxane resins (including alkylalkoxysilane resins), reactive vinyl resins, phenolic resins (resole and novolac), and phenolic/latex resins. The resins may be provided as monomers, oligomers, polymers, or combinations thereof. The primer layer improves adhesion between the polyester backing and the make layer. In some embodiments, the make layer is an alkylated urea-formaldehyde resin, and the size layer can be made from any of the resins described above. In some embodiments, the make layer is a phenolic layer as described above in any of its embodiments, and the size layer can be made from any of the resins described above. In some embodiments, both the make layer and the size layer are made from phenolic resins, which may be combined with a latex including any of those described above in any of the ratios described above.

To promote an association bridge between the make layer and, in some embodiments, the size layer, and the abrasive particles, a silane coupling agent may be included in the make and/or size resin, in some embodiments, phenolic resin. A silane coupling agent is typically preset in an amount of from about 0.01 to 5 percent by weight, more typically in an amount of from about 0.01 to 3 percent by weight, more typically in an amount of from about 0.01 to 1 percent by weight, based on the weight of the abrasive particles, although other amounts may also be used, for example depending on the size of the abrasive particles. Suitable silane coupling agents include, for example, methacryloxypropyltrimethoxysilane, vinyltriethoxysilane, vinyltris(2-methoxyethoxy)silane, 3,4-epoxycyclohexylmethyltrimethoxysilane, gamma-glycidoxypropyltrimethoxysilane, and gamma-mercaptopropyltrimethoxysilane (e.g., as available under the respective trade designations A-174, A-151, A-172, A-186, A-187, and A-189 from Witco Corp. of Greenwich, Conn.), allyltriethoxysilane, diallyldichlorosilane, divinyldiethoxysilane, and meta, para-styrylethyltrimethoxysilane (e.g., as commercially available under the respective trade designations A0564, D4050, D6205, and S 1588 from United Chemical Industries, Bristol, Pa.), dimethyldiethoxysilane, dihydroxydiphenylsilane, triethoxysilane, trimethoxysilane, triethoxysilanol, 3-(2-aminoethylamino)propyltrimethoxysilane, methyltrimethoxysilane, vinyltriacetoxysilane, methyltriethoxysilane, tetraethyl orthosilicate, tetramethyl orthosilicate, ethyltriethoxysilane, amyltriethoxysilane, ethyltrichlorosilane, amyltrichlorosilane, phenyltrichlorosilane, phenyltriethoxysilane, methyltrichlorosilane, methyldichlorosilane, dimethyldichlorosilane, dimethyldiethoxysilane, and combinations thereof.

The make and/or size layers and their resin precursors may optionally contain additives such as, for example, colorants, grinding aids, fillers, viscosity modifying agents, wetting agents, dispersing agents, light stabilizers, and antioxidants.

Fillers useful in the make layer and/or size layer generally have an average particle size range of 0.1 to 50 micrometers, typically 1 to 30 micrometers. Examples of useful fillers include metal carbonates (e.g., calcium carbonate such as chalk, calcite, marl, travertine, marble, and limestone; calcium magnesium carbonate; sodium carbonate; and magnesium carbonate), silica (e.g., quartz, glass beads, glass bubbles, and glass fibers), silicates (e.g., talc, clays such as montmorillonite, feldspar, mica, calcium silicate, calcium metasilicate, sodium aluminosilicate, sodium silicate, lithium silicate, and hydrous and anhydrous potassium silicate), metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide such as lime, aluminum oxide, tin oxide such as stannic oxide, titanium dioxide), sulfites (e.g., calcium sulfite), thermoplastic particles (e.g., polycarbonate, polyetherimide, polyester, polyethylene, polysulfone, polystyrene, acrylonitrile-butadiene-styrene block copolymer, polypropylene, acetal polymers, polyurethanes, nylon particles) and thermosetting particles (e.g., phenolic bubbles, phenolic beads, polyurethane foam particles). The filler may also be a salt such as a halide salt. Examples of halide salts include sodium chloride, potassium cryolite, sodium cryolite, ammonium chloride, potassium tetrafluoroborate, sodium tetrafluoroborate, silicon fluorides, potassium chloride, and magnesium chloride. Other miscellaneous fillers include sulfur, organic sulfur compounds, graphite, and metallic sulfides.

Abrasive articles according to the present disclosure and/or made by the process of the present disclosure including a polyester backing. For abrasive articles the polyester backing can be a film backing described above. In addition to the dense, monolithic film backing, fibrous backings are also useful in the abrasive articles described herein. In some embodiments, the polyester backing is a nonwoven. Nonwoven abrasive articles typically include an open porous lofty polymer filament structure having abrasive particles distributed throughout the structure and adherently bonded therein by an organic binder, in some embodiments, a phenolic resin as described above in any of its embodiments. Examples of filaments include polyester fibers made from any of the polyesters described above in connection with the polyester film backing.

Nonwoven abrasives according to the present disclosure include nonwoven webs suitable for use in abrasives. The term "nonwoven" refers to a material having a structure of individual fibers or threads that are interlaid but not in an identifiable manner such as in a knitted fabric. Typically, the nonwoven web comprises an entangled web of fibers. The fibers may comprise continuous fiber, staple fiber, or a combination thereof. For example, the nonwoven web may comprise staple fibers having a length of at least about 20 mm, at least about 30 mm, or at least about 40 mm, and less than about 110 mm, less than about 85 mm, or less than about 65 mm, although shorter and longer fibers (e.g., continuous filaments) may also be useful. The fibers may have a fineness or linear density of at least about 1.7 decitex (dtex, i.e., grams/10000 meters), at least about 6 dtex, or at least about 17 dtex, and less than about 560 dtex, less than about 280 dtex, or less than about 120 dtex, although fibers having lesser and/or greater linear densities may also be useful. Mixtures of fibers with differing linear densities may be useful, for example, to provide an abrasive article that upon use will result in a specifically preferred surface finish. If a spunbond nonwoven is used, the filaments may be of substantially larger diameter, for example, up to 2 mm or more in diameter. The fibers may be tensilized and crimped but may also be continuous filaments such as those formed by an extrusion process. Combinations of fibers may also be used.

The nonwoven web may be manufactured, for example, by conventional air laid, carded, stitch bonded, spun bonded, wet laid, and/or melt blown procedures. Air laid nonwoven webs may be prepared using equipment such as, for example, that available under the trade designation "RANDO WEBBER" commercially available from Rando Machine Company of Macedon, N.Y.

Before impregnation with the binder precursor, in some embodiments, the phenolic resin, the nonwoven fiber web typically has a weight per unit area (i.e., basis weight) of at least about 50 grams per square meter (gsm), at least about 100 gsm, or at least about 200 gsm; and/or less than about 400 gsm, less than about 350 gsm, or less than about 300 gsm, as measured prior to any coating, although greater and lesser basis weights may also be used. In addition, before impregnation with the binder precursor, in some embodiments, phenolic resins, the fiber web typically has a thickness of at least about 5 mm, at least about 6 mm, or at least about 10 mm; and/or less than about 200 mm, less than about 75 mm, or less than about 30 mm, although greater and lesser thicknesses may also be useful.

Further details concerning nonwoven abrasive articles, abrasive wheels and methods for their manufacture may be found, for example, in U.S. Pat. No. 2,958,593 (Hoover et al.); U.S. Pat. No. 5,591,239 (Larson et al.); U.S. Pat. No. 6,017,831 (Beardsley et al.); and U.S. Pat. Appln. Publ. 2006/0041065 A 1 (Barber, Jr.).

Frequently, it is useful to apply a prebond resin to the nonwoven web before coating with the binder precursor, in some embodiments, phenolic resins. The prebond resin serves, for example, to help maintain the nonwoven web integrity during handling, and may also facilitate bonding of the binder to the nonwoven web. Examples of prebond resins include phenolic resins, urethane resins, hide glue, acrylic resins, urea-formaldehyde resins, melamine-formaldehyde resins, epoxy resins, and combinations thereof. The amount of prebond resin used in this manner is typically adjusted toward the minimum amount consistent with bonding the fibers together at their points of crossing contact. If the nonwoven web includes thermally bondable fibers, thermal bonding of the nonwoven web may also be helpful to maintain web integrity during processing.

Abrasive articles according to the present disclosure may be converted, for example, into a belt, roll (e.g., tape roll), disc (e.g., perforated disc), or sheet. They may be used by hand or in combination with a machine such as a belt grinder. For belt applications, the two free ends of an abrasive sheet are joined together and spliced, thus forming an endless belt. A spliceless belt, for example, as described in WO 93/12911 (Benedict), can also be used. Generally, an endless abrasive belt can traverse over at least one idler roll and a platen or contact wheel. The hardness of the platen or contact wheel is adjusted to obtain the desired rate of cut and workpiece surface finish. The abrasive belt speed depends upon the desired cut rate and surface finish and generally ranges anywhere from about 20 to 100 surface meters per second, typically between 30 to 70 surface meter per second. The belt dimensions can range from about 0.5 cm to 100 cm wide or 1.0 cm to 30 cm wid, and from about 5 cm to 1,000 cm long or from 50 cm to 500 cm long. Abrasive tapes are continuous lengths of the abrasive article and can range in width from about 1 mm to 1,000 mm or from about 5 mm to 250 mm. The abrasive tapes are usually unwound, traversed over a support pad that forces the tape against the workpiece, and then rewound. The abrasive tapes can be continuously fed through the abrading interface and can be indexed. Abrasive discs, which may also include that which is in the shape known in the abrasive art as "daisy", can range from about 50 mm to 1,000 mm in diameter or about 50 mm to about 100 mm in diameter. Typically, abrasive discs are secured to a back-up pad by an attachment means and can rotate between 100 to 20,000 revolutions per minute, typically between 1,000 to 15,000 revolutions per minute.

The abrasive article can be used to abrade a workpiece. The workpiece can be any type of material such as metal, metal alloys, exotic metal alloys, ceramics, glass, wood, wood like materials, composites, painted surface, plastics, reinforced plastic, stones, and combinations thereof. The workpiece may be flat or may have a shape or contour associated with it. Examples of workpieces include glass eye glasses, plastic eye glasses, plastic lenses, glass television screens, metal automotive components (e.g., clutch plates and other flat automotive components), stainless steel coils, plastic components, particle board, painted automotive components, magnetic media, tubing, plates, hydraulic rods, and elevator shafts.

During abrading, the abrasive article and the workpiece are moved relative to each other such that the abrasive article abrades the workpiece. The abrasive article is moved relative to the workpiece, or vice versa. Depending upon the application, the force at the abrading interface can range from about 0.1 kg to over 1000 kg. Typically, this range is between 1 kg to 500 kg of force at the abrading interface. In addition, abrading may occur under wet conditions. Wet conditions can include water and/or a liquid organic compound. Examples of typical liquid organic compounds include lubricants, oils, emulsified organic compounds, cutting fluids, and soaps. These liquids may also contain other additives such as defoamers, degreasers, and corrosion inhibitors. The abrasive article may oscillate at the abrading interface during use, which may result in a finer surface on the workpiece being abraded.

Various aspects of the present disclosure are described below.

In a first aspect, the present disclosure provides an article comprising:
  a polyester film backing; and
  a primer layer comprising a carboxylated styrene butadiene copolymer crosslinked with a polyfunctional aziridine disposed on a major surface of the polyester film backing.

In a second aspect, the present disclosure provides the article of the first aspect, wherein the primer layer has a thickness of at least ten, 15, 20, or 25 micrometers or greater than ten micrometers.

In a third aspect, the present disclosure provides the article of the first or second aspect, wherein the polyester film backing is surface-treated.

In a fourth aspect, the present disclosure provides the article of any one of the first to third aspects, wherein the polyester film backing comprises polyethylene terephthalate.

In a fifth aspect, the present disclosure provides the article of any one of the first to fourth aspects, wherein the primer layer further comprises a surfactant.

In a sixth aspect, the present disclosure provides the article of any one of the first to fifth aspects, further comprising a layer of phenolic disposed on the primer layer on a surface opposite the polyester film backing.

In a seventh aspect, the present disclosure provides article of any one of the first to sixth aspects, wherein the phenolic is rubber modified.

In an eighth aspect, the present disclosure provides the article of any one of the first to seventh aspects, wherein the layer of phenolic further comprises abrasive particles.

In a ninth aspect, the present disclosure provides the article of any one of the first to eighth aspects, further comprising a size layer disposed over the abrasive particles.

In a tenth aspect, the present disclosure provides a process for making the article of any one of the first to fourth aspects, the process comprising:
  coating a composition comprising the carboxylated styrene butadiene copolymer and the polyfunctional aziridine onto the major surface of the polyester film backing; and
  crosslinking the carboxylated styrene butadiene copolymer with the polyfunctional aziridine.

In an eleventh aspect, the present disclosure provides the process of the tenth aspect, further comprising combining a latex comprising the carboxylated styrene butadiene copolymer with the polyfunctional aziridine to make the composition.

In a twelfth aspect, the present disclosure provides the process of the tenth or eleventh aspects, wherein the composition further comprises a surfactant.

In a thirteenth aspect, the present disclosure provides the process of any one of the tenth to twelfth aspects, further comprising:
  coating a phenolic resin on the primer layer on a surface opposite the polyester film backing; and
  curing the phenolic resin.

In a fourteenth aspect, the present disclosure provides the process of the thirteenth aspect, wherein the phenolic resin is rubber modified.

In a fifteenth aspect, the present disclosure provides the process of the fourteenth aspect, further comprising combining the phenolic resin with a latex.

In a sixteenth aspect, the present disclosure provides the process of the fifteenth aspect, wherein a weight ratio of the phenolic resin to the latex is in a range from 99:1 to 50:50.

In a seventeenth aspect, the present disclosure provides the process of any one of the thirteenth to the sixteenth aspects, further comprising disposing abrasive particles on the phenolic resin before curing the phenolic resin.

In an eighteenth aspect, the present disclosure provides the process of the seventeenth aspect, further comprising:
  coating a size resin on the abrasive particles; and
  curing the size resin.

In a nineteenth aspect, the present disclosure provides an abrasive article comprising:
  a polyester backing;
  a primer layer comprising a carboxylated styrene butadiene copolymer crosslinked with a polyfunctional aziridine disposed on a major surface of the polyester backing; and
  a phenolic layer disposed on the primer layer on a surface opposite the polyester backing, the phenolic layer comprising abrasive particles.

In a twentieth aspect, the present disclosure provides the abrasive article of the nineteenth aspect, wherein the primer layer has a thickness of at least ten, 15, 20, or 25 micrometers or greater than ten micrometers.

In a twenty-first aspect, the present disclosure provides the abrasive article of the nineteenth or twentieth aspect, wherein the polyester backing is surface-treated.

In a twenty-second aspect, the present disclosure provides the abrasive article of any one of the nineteenth to twenty-first aspects, wherein the polyester backing comprises polyethylene terephthalate.

In a twenty-third aspect, the present disclosure provides the abrasive article of any one of the nineteenth to twenty-second aspects, wherein the polyester backing comprises a nonwoven.

In a twenty-fourth aspect, the present disclosure provides the abrasive article of any one of the nineteenth to twenty-third embodiments, wherein the primer layer further comprises a surfactant.

In a twenty-fifth aspect, the present disclosure provides the abrasive article of any one of the nineteenth to twenty-fourth aspects, wherein the phenolic is rubber modified.

In a twenty-sixth aspect, the present disclosure provides the abrasive article of any one of the nineteenth to twenty-fifth aspects, further comprising a size layer disposed over the abrasive particles.

In a twenty-seventh aspect, the present disclosure provides a process for making the abrasive article of any one of the nineteenth to twenty-third aspects, the process comprising:
  coating a composition comprising the carboxylated styrene butadiene copolymer and the polyfunctional aziridine onto the major surface of the polyester film backing;
  crosslinking the carboxylated styrene butadiene copolymer with the polyfunctional aziridine;
  coating a phenolic resin on the primer layer on a surface opposite the polyester film backing; and
  curing the phenolic resin.

In a twenty-eighth aspect, the present disclosure provides the process of the twenty-seventh aspect, wherein the phenolic resin comprises the abrasive particles.

In a twenty-ninth aspect, the present disclosure provides the process of the twenty-seventh or twenty-eighth aspect, further comprising the disposing abrasive particles on the phenolic resin before curing the phenolic resin.

In a thirtieth aspect, the present disclosure provides process of any one of the twenty-seventh to twenty-ninth aspects, further comprising combining a latex comprising the carboxylated styrene butadiene copolymer with the polyfunctional aziridine to make the composition.

In a thirty-first aspect, the present disclosure provides the process of any one of the twenty-seventh to the thirtieth aspects, wherein the composition further comprises a surfactant.

In a thirty-second aspect, the present disclosure provides the process of any one of the twenty-seventh to thirty-first aspects, wherein the phenolic resin is rubber modified.

In a thirty-third aspect, the present disclosure provides the process of the thirty-second aspect, further comprising combining the phenolic resin with a latex.

In a thirty-fourth aspect, the present disclosure provides the process of the thirty-third aspect, wherein a weight ratio of the phenolic resin to the latex is in a range from 99:1 to 50:50.

In a thirty-fifth aspect, the present disclosure provides the process of any one of the twenty-seventh to thirty-fourth aspects, further comprising:
  coating a size resin on the abrasive particles; and
  curing the size resin.

In a thirty-sixth aspect, the present disclosure provides a method of improving adhesion between a polyester film backing and a phenolic layer on the polyester film backing, the method comprising:
  coating a composition comprising a carboxylated styrene butadiene copolymer and a polyfunctional aziridine onto a major surface of the polyester film backing;
  crosslinking the carboxylated styrene butadiene copolymer with the polyfunctional aziridine to form a primer layer;
  coating a phenolic resin on the primer layer on a surface opposite the polyester film backing; and
  curing the phenolic resin.

In a thirty-seventh aspect, the present disclosure provides the method of the thirty-sixth aspect, further comprising combining a latex comprising the carboxylated styrene butadiene copolymer with the polyfunctional aziridine to make the composition.

In a thirty-eight aspect, the present disclosure provides the method of the thirty-sixth or thirty-seventh aspect, wherein the composition further comprises a surfactant.

In a thirty-ninth aspect, the present disclosure provides the method of any one of the thirty-sixth to thirty-eighth aspects, wherein the primer layer has a thickness of at least ten, 15, 20, or 25 micrometers or greater than ten micrometers.

In a fortieth aspect, the present disclosure provides the method of any one of the thirty-sixth to thirty-ninth aspects, wherein the polyester film backing is surface-treated.

In a forty-first aspect, the present disclosure provides the method of any one of the thirty-sixth to fortieth aspects, wherein the polyester film backing comprises polyethylene terephthalate.

In a forty-second aspect, the present disclosure provides a method of abrading a workpiece, the method comprising:
providing the article of any one of the eighth, ninth, or nineteenth to twenty-sixth aspects;
frictionally contacting at least a portion of the abrasive particles with at least a portion of a surface of the workpiece; and
moving at least one of the article or the workpiece relative to the other to abrade at least a portion of the surface.

In a forty-third aspect, the present disclosure provides the method of the forty-second aspect, wherein the workpiece comprises at least one of stainless steel, carbon steel, or titanium.

In order that the present disclosure can be more fully understood, the following examples are set forth. It should be understood that these examples are for illustrative purposes only, and are not to be construed as limiting this disclosure in any manner. For example, the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by volume. Unless stated otherwise, all other reagents were obtained, or are available from chemical vendors such as Sigma-Aldrich Company, St. Louis, Missouri, or may be synthesized by known methods.

Examples 1 to 20

A primer coating solution was prepared with a 3-component composition including latex resin (obtained under trade designation "ROVENE 5900" from Mallard Creek Polymers, Charlotte, North Carolina), polyfunctional aziridine (obtained under trade designation "PZ-28" from PolyAziridine LLC, Morgantown, New Jersey) and surfactant (obtained under trade designation "GEMTEX SC-85P" from Innospec Active Chemicals, Spencer, North Carolina) at 10:0.5:0.03 wet weight ratio.

Three types of PET films (obtained from 3M Company, St. Paul, Minnesota, made from thermally extruded, biaxially stretched, polyethylene terephthalate (PET) resin) of varying thickness, i.e., 50.8 micrometers, 76.2 micrometers and 127 micrometers were treated with primer coating. For Examples 1-15, the PET films were treated with primer coating using a "GARDCO" Automatic Drawdown Machine II (obtained from Paul N. Gardner Company, Inc., Pompano Beach, Florida). For each type of PET film, primer of five thicknesses were coated with different Mayer rods, ranging from 10 micrometers to 30 micrometers in 5-micrometer increments. The PET film thickness and primer coating thickness used in Examples 1-15 were listed in Table 1. The films were then dried and cured in a conveyor belt oven at 121.1 degrees Celsius (° C.) at a line speed of 1.83 meter/min. The total drying and curing time was 2 minutes.

TABLE 1

| Example | Plain PET Film Thickness, micrometers | Primer Coating Thickness, micrometers |
| --- | --- | --- |
| Example 1 | 50.8 | 10 |
| Example 2 | 50.8 | 15 |
| Example 3 | 50.8 | 20 |
| Example 4 | 50.8 | 25 |
| Example 5 | 50.8 | 30 |
| Example 6 | 76.2 | 10 |
| Example 7 | 76.2 | 15 |
| Examples 8, 16 | 76.2 | 20 |
| Examples 9, 17 | 76.2 | 25 |
| Examples 10, 18, 19, 20 | 76.2 | 30 |
| Example 11 | 127 | 10 |
| Example 12 | 127 | 15 |
| Example 13 | 127 | 20 |
| Example 14 | 127 | 25 |
| Example 15 | 127 | 30 |

In Examples 16-20, a 30 cm wide, 76.2 micron thick PET film was used. In Examples 16, 17, 19, and 20, PET film was corona treated. This corona discharge process was generally described in U.S. Pat. No. 5,972,176 (Kirk et al.). The film substrate was placed in contact with a 25-centimeter (cm) diameter, 50 cm face width steel ground roll coated with a 2 mm thick layer of CL500 ceramic dielectric manufactured by American Roller of Union Grove, Wis. In this "covered roll" configuration, the powered electrodes consisted of two 200 $cm^2$, 33 cm face-width stainless steel shoes separated from the ground roll by an electrode gap of 1.5 millimeters (mm) (60 mils). The electrodes were connected to a model P6050 variable-frequency power supply (available from Pillar Technologies Inc. Hartland, Wis.). The net power dissipated in the corona was measured with a directional power meter incorporated into the power supply. The normalized energy of the corona treatment (in $J/cm^2$) was calculated from the net power and the film velocity: normalized energy=P/wV, where P was the net power (in W), w was the electrode width (in cm), and V was the film velocity (in cm/s). Corona treatment was run at 0.1 $J/cm^2$ or 0.3 $J/cm^2$, which can be achieved by using a power of 100-500 W and a web speed of 30-50 cm/sec.

Plain PET film and PET films with corona treatment were then subsequently coated with a layer of primer solution using a slot die. The coated films were then dried and cured in a conveyor belt oven at 121.1° C. The target coating thickness was achieved by adjusting primer solution feed rates. The experimental conditions used for Examples 16-20 are shown in Table 2.

TABLE 2

| Example | Corona Treatment Energy, J/cm2 | Primer Coating Thickness, micrometers | Line Speed, meter/min | Oven Temperature, ° C. | Drying Time, minutes |
| --- | --- | --- | --- | --- | --- |
| Example 16 | 0.1 | 20 | 15.24 | 121.1 | 3.60 |
| Example 17 | 0.1 | 25 | 15.24 | 121.1 | 3.60 |
| Example 18 | 0.0 | 30 | 25.00 | 121.1 | 2.12 |
| Example 19 | 0.1 | 30 | 25.00 | 121.1 | 2.12 |
| Example 20 | 0.3 | 30 | 25.00 | 121.1 | 2.12 |

For Examples 1 to 15, a make resin was prepared, according to the composition listed in Table 3. The formulation was stirred at room temperature until homogeneous.

TABLE 3

| Raw Material Descriptions | Supplier | Weight % |
| --- | --- | --- |
| Phenolic Resin R23155 | Georgia Pacific (Columbus, Ohio) | 89.7% |
| Tap Water | | 10.0% |
| "GEMTEX SC-85P" | Innospec Active Chemicals (Spencer, North Carolina) | 0.3% |

For Examples 1 to 15, a size resin was prepared, according to the composition listed in Table 4. The formulation was stirred at room temperature until homogeneous.

TABLE 4

| Raw Material Descriptions | Supplier | Weight % |
| --- | --- | --- |
| Phenolic Resin R23155 | Georgia Pacific (Columbus, Ohio) | 90.0% |
| Tap Water | | 10.0% |

For Examples 1 to 15, the make resin was applied on to primer treated PET film using a "GARDCO" Automatic Drawdown Machine II with an automatic Mayer rod #4. The target make resin weight is 12.6 grams per square meter (gsm). 83.7 gsm of abrasive mineral P240 BFRPL aluminum oxide (obtained from Imerys, Villach, Austria) was then evenly sprinkled onto the make resin by hand. The sheets were processed through a conveyor belt oven at 148.9° C. at a line speed of 0.9 meter/min. The total drying and curing time was 12 minutes. The size resin was then coated onto the make layer and abrasive particles at a coating weight of 41.9 gsm using paint roller. The resultant article was then processed through the conveyor belt oven again at 148.9° C. at a line speed of 0.9 meter/min. The total drying and curing time was 12 minutes. After curing was complete, the coated abrasive material was converted into 2.54-centimeter×15.24-centimeter strips for testing.

For Examples 16 to 20, a make resin was prepared, according to the composition listed in Table 5. The formulation was stirred at room temperature until homogeneous. A size resin was prepared, according to the composition listed in Table 6. The formulation was stirred at room temperature until homogeneous.

TABLE 5

| Raw Material Descriptions | Supplier | Weight % |
| --- | --- | --- |
| Phenolic Resin R23155 | Georgia Pacific (Columbus, Ohio) | 72.0% |
| Tap Water | | 10.0% |
| "ROVENE 5900" | Mallard Creek Polymers (Charlotte, North Carolina) | 18.0% |

TABLE 6

| Raw Material Descriptions | Supplier | Weight % |
| --- | --- | --- |
| Phenolic Resin R23155 | Georgia Pacific (Columbus, Ohio) | 57.14% |
| Tap Water | | 7.94% |
| "ROVENE 5900" | Mallard Creek Polymers (Charlotte, North Carolina) | 14.29% |
| Pigment | Venator Materials Corporation (Woodlands, Texas) | 0.53% |
| $CaCO_3$ Filler | Imerys (Roswell, Georgia) | 18.80% |
| TiOx | The Chemours Company (Wilmington, Delaware) | 1.30% |

The make resin was roll coated on to the treated polyester backing, at a coating weight of 12.6 gsm. The abrasive mineral P240 BFRPL aluminum oxide (obtained from Imerys, Villach, Austria) was then coated onto the make resin at a coating weight of 83.7 gsm by electrostatic coating. The web was hung on racks and cured according to the make pre-cure conditions described in Table 7. The size resin was then roll coated onto the make layer and abrasive particles at a coating weight of 41.9 gsm. The resultant article was then hung on racks and cured according to the size cure conditions described in Table 7. After curing was complete, the coated abrasive material was flexed and converted into 2.54-centimeter×15.24-centimeter trips for testing.

TABLE 7

| | |
| --- | --- |
| Make Pre-cure Conditions | 10 minutes at 85° C., 20 minutes at 90° C., 1 hour at 110° C. |
| Size Cure Conditions | 10 min at 85° C., 20 min at 90° C., 35 min at 105° C., 100 min at 110° C., 40 min at 105° C., 35 min at 80° C. |

Abrasive Article Hand Shelling Test

Manual abrasive adhesion testing was performed by a sequential bending and hard pressing protocol with 2.54-centimeter×15.24-centimeter trips. For testing purposes, the coated abrasive strips were first bent at 180 degrees with the coating layer pointing outwards and then the folding line was pressed hard manually; repeated this bending and pressing process continuously in machine direction and then repeated the folding and pressing process in cross web direction so that the coating on the film sample testing area was exposed to this bending & hard pressing. A visual rating of either 1, 3 or 5 was given to each sample based on the amount of shelling observed, described in Table 8 below. If the coating didn't come off, then it was called no shelling, meaning good adhesion, and given an acceptable visual rating of 1. Otherwise, it was called shelling, meaning poor adhesion, and given a visual rating of 3 or 5. Hand shelling test results for abrasive article Examples 1 to 20 are shown in Table 9. Samples were evaluated and given a visual rating by three different operators, and the average results are shown in Table 9, below. When no primer was used on plain PET film and corona-treated PET film, heavy shelling was observed, regardless of the thickness of backing, for abrasive articles made according to the method described above.

TABLE 8

Hand shelling reference table.

Figure 4:
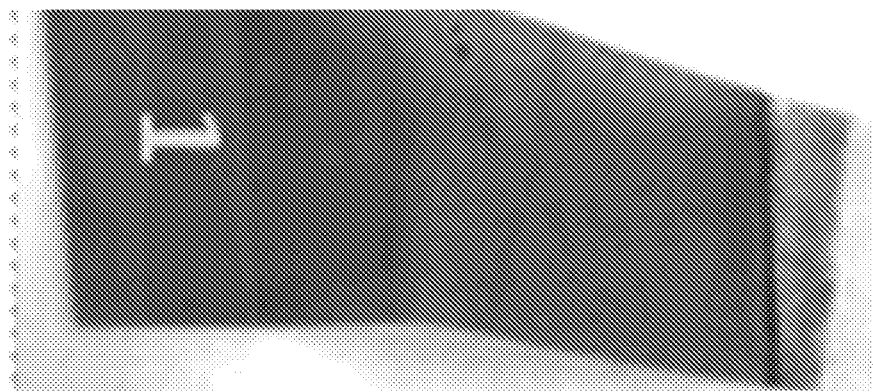
FIG. 4 is a photograph providing a visual reference of a "1" rating (that is, no shelling) after carrying out the hand shelling test described in the Examples.
Figure 5:
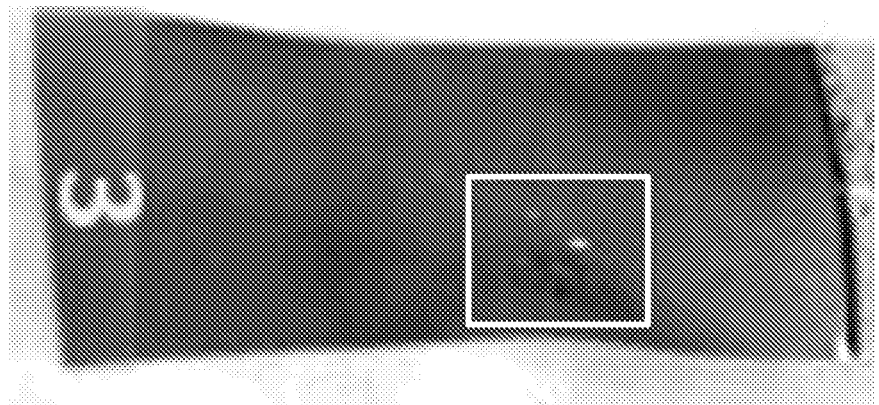
FIG. 5 is a photograph providing a visual reference of a "3" rating (that is, light shelling) after carrying out the hand shelling test described in the Examples.
Figure 6:
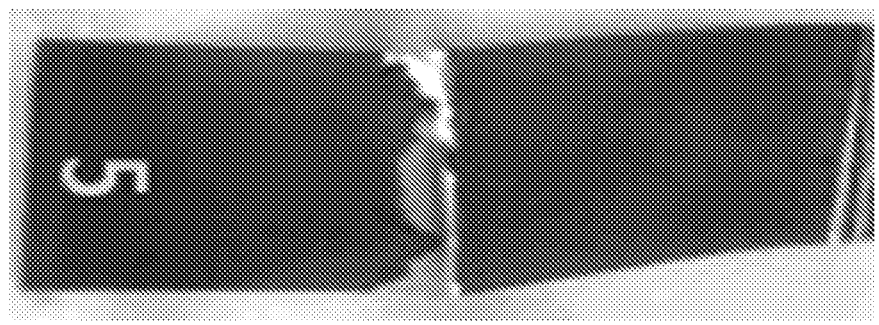
FIG. 6 is a photograph providing a visual reference of a "5" rating (that is, heavy shelling) after carrying out the hand shelling test described in the Examples.

| Rating Description | Visual Reference |
| --- | --- |
| 1 = Acceptable/no shelling observed | FIG. 4 |
| 3 = Failure/light shelling observed | FIG. 5 |
| 5 = Failure/heavy shelling observed | FIG. 6 |

TABLE 9

| Example | Adhesion Rating |
| --- | --- |
| Example 1 | 5 |
| Example 2 | 5 |
| Example 3 | 3 |
| Example 4 | 2 |
| Example 5 | 1 |
| Example 6 | 5 |
| Example 7 | 5 |
| Example 8 | 5 |
| Example 9 | 3 |
| Examples 10 | 1 |
| Example 11 | 4 |
| Example 12 | 3 |
| Example 13 | 3 |
| Example 14 | 1 |
| Example 15 | 1 |
| Example 19 | 1 |
| Example 17 | 1 |
| Example 16 | 3 |

Illustrative Examples (Ill. Ex.) 21 to 24 and Examples 25 to 28

PET films with the thickness of 76.2 micronmeters (obtained from 3M Company, St. Paul, Minn.) were coated using Mayer rod #6 with latex resin (carboxylated styrene butadiene rubber with 50% solids content, obtained under trade designation "ROVENE 5900" from Mallard Creek Polymers, Charlotte, N.C.) having different concentration levels of crosslinkers. The concentration levels of crosslinker were calculated by dividing the weights of crosslinker to the weights of latex resin, for example, 20% crosslinker concentration level is equivalent to adding 2 grams of crosslinker to 10 grams of latex resin. "CYMEL 303" (hexamethoxymethylmelamine in liquid form at >98% non-volatile, obtained under trade designation "CYMEL 303" from Cytec Industries Inc., Woodland Park, N.J.) and "PZ-28" (polyfunctional aziridine, obtained under the trade designation "PZ-28" from PolyAziridine LLC, Morgantown, N.J.) were used as crosslinkers here and their concentration levels used are listed in Table 10. In addition, 0.3% surfactant (obtained under trade designation "GEMTEX SC-85P" from Innospec Active Chemicals, Spencer, N.C.) was added to the coating solutions. For each film, a coating of 7 micrometers was applied. The coated film samples were placed in a convection oven at 120° C. temperature for 5 minutes.

TABLE 10

| Example | The concentration level of CYMEL 303 | The concentration level of PZ-28 | Test Rating |
| --- | --- | --- | --- |
| Ill. Ex. 21 | 0 | 0 | 5 |
| Ill. Ex. 22 | 10% | 0 | 5 |
| Ill. Ex. 23 | 20% | 0 | 5 |
| Ill. Ex. 24 | 30% | 0 | 2 |
| Example 25 | 0 | 0.6% | 5 |
| Example 26 | 0 | 1.0% | 2 |
| Example 27 | 0 | 2.5% | 1 |
| Example 28 | 0 | 5.0% | 0 |

The adhesion of primer coatings to PET film was evaluated according to ISO 2409 Cross-Cut Test. A Cross-Cut Kit obtained from BYK Gardner USA, Columbia, Maryland was used for the testing. According to ISO 2409 Cross-Cut Test standard, the higher the cross-cut test rating, the poorer the adhesion of coating to the substrate with "5" rating being the worst to "0" rating being the best. The results are shown in Table 10.

This disclosure is not limited to the above-described embodiments but is to be controlled by the limitations set forth in the following claims and any equivalents thereof. This disclosure may be suitably practiced in the absence of any element not specifically disclosed herein.

What is claimed is:

1. An article comprising:
 a non-fibrous polyester film backing; and
 a primer layer comprising a carboxylated styrene butadiene copolymer crosslinked with a polyfunctional aziridine disposed on a major surface of the non-fibrous polyester film backing.

2. The article of claim 1, wherein the primer layer has a thickness of at least ten micrometers.

3. The article of claim 1, wherein the non-fibrous polyester film backing is surface-treated.

4. The article of claim 1, wherein the non-fibrous polyester film backing comprises polyethylene terephthalate.

5. The article of claim 1, further comprising a layer of phenolic disposed on the primer layer on a surface opposite the non-fibrous polyester film backing.

6. The article of claim 5, wherein the phenolic is rubber modified.

7. The article of claim 5, wherein the layer of phenolic further comprises abrasive particles.

8. The article of claim 7, further comprising a size layer disposed over the abrasive particles.

9. A process for making the article of claim 1, the process comprising:
 coating a composition comprising the carboxylated styrene butadiene copolymer and the polyfunctional aziridine onto the major surface of the non-fibrous polyester film backing; and crosslinking the carboxylated styrene butadiene copolymer with the polyfunctional aziridine.

10. The process of claim 9, further comprising combining a latex comprising the carboxylated styrene butadiene copolymer with the polyfunctional aziridine to make the composition.

11. The process of claim 9, wherein the composition further comprises a surfactant.

12. The process of claim 9, further comprising:
coating a phenolic resin on the primer layer on a surface opposite the non-fibrous polyester film backing; and
curing the phenolic resin.

13. The process of claim 12, further comprising disposing abrasive particles on the phenolic resin before curing the phenolic resin.

14. A method of abrading a workpiece, the method comprising:
providing the article of claim 7;
frictionally contacting at least a portion of the abrasive particles with at least a portion of a surface of the workpiece; and
moving at least one of the article or the workpiece relative to the other to abrade at least a portion of the surface.

15. An abrasive article comprising:
a non-fibrous polyester film backing, wherein the non-fibrous polyester film backing comprises polyethylene terephthalate;
a primer layer comprising a carboxylated styrene butadiene copolymer crosslinked with a polyfunctional aziridine disposed on a major surface of the non-fibrous polyester film backing;
a phenolic layer disposed on the primer layer on a surface opposite the non-fibrous polyester film backing, the phenolic layer comprising abrasive particles; and
a size layer disposed over the abrasive particles.

16. The abrasive article of claim 15, wherein the primer layer has a thickness of at least ten micrometers.

17. The abrasive article of claim 15, wherein the non-fibrous polyester film backing comprises polyethylene terephthalate that is surface-treated.

18. The abrasive article of claim 15, wherein the phenolic is rubber modified.

19. The process of claim 13, further comprising:
coating a size resin on the abrasive particles; and
curing the size resin.

20. The process of claim 12, further comprising combining the phenolic resin with a latex.

* * * * *